(12) United States Patent
Schadler

(10) Patent No.: US 8,036,594 B2
(45) Date of Patent: Oct. 11, 2011

(54) CIRCULARLY POLARIZED OMNIDIRECTIONAL IN-BUILDING SIGNAL BOOSTER APPARATUS AND METHOD

(75) Inventor: John L. Schadler, Raymond, ME (US)

(73) Assignee: SPX Corporation, Charlotte, NC (US)

( * ) Notice: Subject to any disclaimer, the term of this patent is extended or adjusted under 35 U.S.C. 154(b) by 878 days.

(21) Appl. No.: 11/954,694

(22) Filed: Dec. 12, 2007

(65) Prior Publication Data
US 2009/0156118 A1    Jun. 18, 2009

(51) Int. Cl.
*H04B 7/14* (2006.01)

(52) U.S. Cl. ......... 455/25; 455/66.1; 455/3.02; 455/271

(58) Field of Classification Search ............... 455/3.01, 455/7, 13.3, 15, 24, 66.1, 67.11, 562.1, 313, 455/341, 25, 260, 271, 3.02; 343/795, 872, 343/890

See application file for complete search history.

(56) References Cited

U.S. PATENT DOCUMENTS
7,649,505 B2 *   1/2010   Schadler ............... 343/890
2007/0021095 A1 * 1/2007   Cheng et al. ........... 455/403

OTHER PUBLICATIONS
John L. Schadler, U.S. Appl. No. 11/826,100 entitled "Circularly Polarized Low Wind Load Omnidirectional Antenna Apparatus and Method," filed Jul. 12, 2007.

* cited by examiner

*Primary Examiner* — John J Lee
(74) *Attorney, Agent, or Firm* — Baker & Hostetler LLP

(57) ABSTRACT

A rebroadcasting apparatus for mobile media includes a receiving antenna and a transmitting antenna. The signal to be rebroadcast is received with a circularly polarized directional antenna. The transmitting antenna has circular polarization opposite to the polarization of the receiving antenna. Amplifiers and filters may be included between receiving and transmitting antennas to regulate retransmitted signal quality. The transmitting antenna uses one or more bays of quasi-helical dipole radiators excited using manifold feed equipped with tuning paddles. The transmitting antenna may be formed from light-weight sheet metal or other readily mass-produced materials. The transmitting antenna may be housed within an ordinary security camera enclosure or similar radio-transparent housing.

22 Claims, 10 Drawing Sheets

CIRCULARLY POLARIZED OMNIDIRECTIONAL IN-BUILDING SIGNAL BOOSTER APPARATUS AND METHOD

FIELD OF THE INVENTION

The present invention relates generally to radio frequency (RF) electromagnetic signal broadcasting systems. More particularly, the present invention relates to single-feed circularly polarized omnidirectional helical antenna systems for auxiliary broadcasting.

BACKGROUND OF THE INVENTION

The background section for U.S. nonprovisional patent application Ser. No. 11/826,100 ("the '100 application"), titled "Circularly Polarized Low Wind Load Omnidirectional Antenna Apparatus and Method," filed Jul. 12, 2007, which is hereby incorporated by reference in its entirety, addresses the opportunity introduced by opening previous television channels in the band from about 700 MHz to 750 MHz for new uses. These uses potentially include at least moderate-power broadcasting directed toward handheld receivers and related technologies and services. Broadcast antennas such as those presented in the '100 application address the requirements for wide-range coverage within this band, with a power level of 50 kilowatts effective radiated power (ERP) or less, in accordance with FCC regulations, as directed by 47 C.F.R. §27.50(c) and §27.55(a)(2).

Broadcast antennas such as those described in the '100 application are useful for economical provision of general coverage above local terrain. The relatively short wavelength dictates small size of each radiative element, associated with small clearance between conductive elements of differing potential. High power translates to high voltage, leading to risk of arcing and dielectric breakdown in such small elements. Large (high gain, multi-element) antennas permit reduction in the total number of transmitter sites needed to serve a region, but can introduce coverage (fill) and certain safety issues. Small (low gain, few element) antennas may require large numbers of transmitter sites to achieve coverage, aggravating logistical and cost issues.

Even assuming optimized antenna properties, however, use of the 700-750 MHz band introduces an additional consideration, namely building penetration. While very low frequency electromagnetic signals easily penetrate structures (and even sea water to a substantial depth), higher frequencies may be blocked. It is well known that the amplitude-modulated (AM) radio broadcast band, around 1 MHz, can be effectively blocked by ordinary structures such as overpasses, while the frequency-modulated (FM) radio broadcast band, around 100 MHz, has a small enough wavelength to permit usable signals to pass under the same overpasses, but can be impeded or blocked by tunnels and truss-style bridges, for example. All of these signals, as well as very-high-frequency (VHF) television channels, around 50-200 MHz, and lower ultra-high-frequency (UHF) television channels, around 470-700 MHz, pass readily through small amounts of wood, plaster, shingles, and like construction materials to provide signals within ordinary residential buildings, but tend to be stopped by structures having higher conductive content, such as steel-walled or -roofed business construction, steel-reinforced concrete floors, and the like.

The band from 700-750 MHz (former upper-UHF television channels 52-59) is likewise susceptible to such blockage, which can be of particular concern for sales outlets within shopping malls, for example. Ordinary commercial buildings frequently have steel construction, including trusses supporting metal roofs, steel walls, and one or more steel-reinforced concrete floors. Such arrangements provide significant, albeit incidental, shielding against broadcast signals, even when irregularly interrupted with windows and other unpredictable passages that may admit some signals.

Known types of broadcasting facilities are significantly deficient in broadcasting signals within propagation-impeding structures. For example, dipole radiators are sensitive to receiving antenna orientation. Patch antennas are highly directional, requiring attention to placement and orientation. Many antenna types are suitable for high power, and are priced accordingly. Overall systems solutions are significantly lacking: even though a desired signal may exist outside a building in substantially the desired form, such as circular polarization with a good power level, access within the building can be blocked.

Current systems are not capable of reliable delivery of one or more channels of broadcast signals inside a structure, where the structure exhibits an uncontrolled extent of shielding against signals present outside the structure. It is potentially useful to provide small, low-power broadcasting facilities within such propagation-impeding structures as adjuncts to ordinary broadcasting facilities in the vicinity.

SUMMARY OF THE INVENTION

The foregoing disadvantages are overcome, to a great extent, by the present invention, wherein in one aspect an apparatus is provided that in some embodiments provides a broadcast repeater that provides coverage for a broadcast signal within a shielding enclosure.

In accordance with one embodiment of the present invention, a transmitting antenna having at least one bay is presented. The antenna includes a coaxial input port with an outer conductor that serves as a reference potential, a first radiative component, and a power distribution manifold. The first radiative component includes a first substantially arcuate dipole positioned as a quasi-helix with reference to a vertical antenna axis, wherein a location on the dipole proximal to a midpoint thereof is a reference node of the dipole, and wherein a location on the dipole distal to the midpoint thereof is a feed node of the dipole. The first radiative component further includes a number n−1, for n greater than or equal to 1, of additional arcuate dipoles, substantially identical to the first dipole, uniformly radially distributed about the vertical antenna axis, and a cross arm, having a hub in a plane perpendicular to the vertical axis, connected to the input port outer conductor, and operative to connect the port to the n dipoles at the respective reference nodes on the n dipoles. The power distribution manifold includes a feed line originating from a center conductor of the coaxial input port, a manifold feed plate central node connected to the feed line, a number n of feed blades connecting the central node to the respective feed nodes of the n dipoles, and a number n of tuning paddles respectively connected to the feed blades.

In accordance with another embodiment of the present invention, a broadcast repeater system is presented. The broadcast repeater system includes a receiving antenna configured to acquire a broadcast radio transmission, wherein receiving antenna gain and directionality in elevation and azimuth are prescribed, and wherein receiving antenna polarization is elliptical with a first handedness. The system further includes a transmitting antenna configured to radiate a broadcast radio transmission, and an interconnecting signal line coupling the receiving and transmitting antennas, wherein the transmitting antenna radiation pattern is substantially omnidirectional with respect to azimuth, and wherein transmitting antenna polarization is elliptical with a second handedness.

In accordance with still another embodiment of the present invention, a system is presented for rebroadcast of a source signal to a region whereto propagation of the source signal is impeded, wherein the source signal originates from a location external to the system. The rebroadcast system includes an elliptically polarized antenna with a first handedness of polarization for receiving a similarly-polarized broadcast radio signal. The system further includes an elliptically polarized omnidirectional transmitting antenna with a second, opposite handedness of polarization, and an interconnecting signal line that couples the signal from the receiving antenna to the transmitting antenna.

In accordance with yet another embodiment of the present invention, a method is presented for rebroadcasting a signal from a source to a region whereto propagation of the signal is impeded. The method for rebroadcasting includes receiving an electromagnetic signal from a broadcast radio transmission having a first handedness of elliptical polarization and transferring the signal to an amplifier, wherein the amplifier performs the steps of accepting the signal, attenuating out-of-band signal energy, adjusting relative phase of in-band signal frequency components, increasing overall signal power, regulating overall signal power, and furnishing the amplified signal for retransmission. The method further includes applying the received signal to a radio signal emitter having a second handedness of elliptical polarization, and coupling the signal from the emitter to a surrounding region.

There have thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described, and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
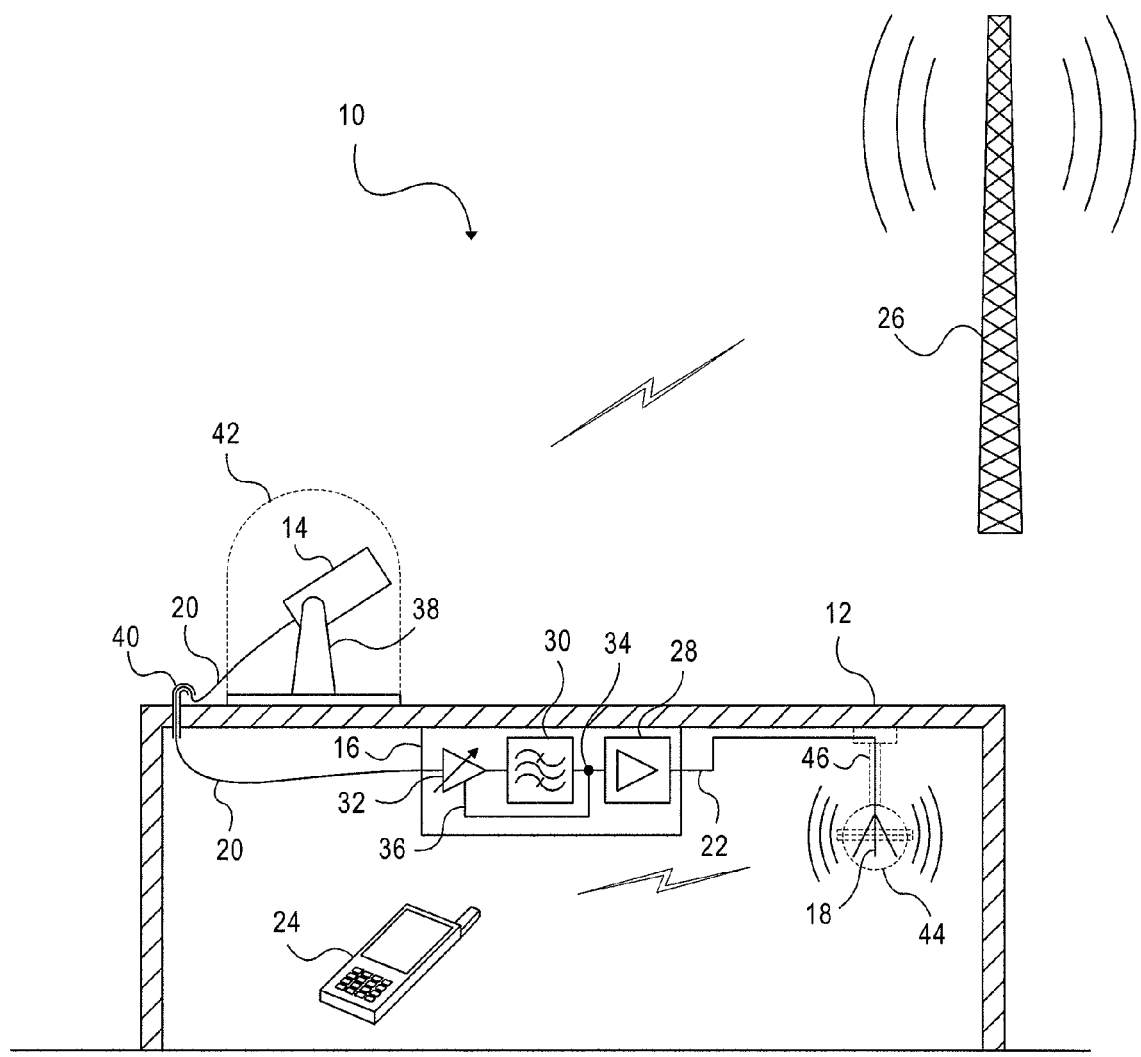
FIG. 1 is a schematic diagram of a broadcast repeater system according to the invention.

The invention will now be described with reference to the drawing figures, in which like reference numerals refer to like parts throughout. An embodiment in accordance with the present invention provides rebroadcast inside a signal-attenuating structure of a signal present outside the structure.

FIG. 1 is a schematic diagram of a system 10 that can reproduce a transmitted signal inside an impeding structure 12 such as a mostly-metal-clad shopping mall. The system 10 includes a receiving antenna 14, an amplifier 16, and a transmitting antenna 18, as well as suitable interconnecting signal lines 20 and 22. It is to be understood that the interconnecting signal lines 20 and 22 in any specific embodiment may be combined or omitted. The system 10 may be used for purposes such as providing digital broadcast video program content for handheld receiving devices 24 within a structure 12.

The existence of a broadcasting signal source, represented by a radiating tower 26 in FIG. 1, located external to a system 10 according to the invention, which produces an elliptically-polarized output signal that is blocked or interfered with by enclosures such as the structure 12 of FIG. 1, is implicit in at least some embodiments consistent with FIG. 1. In other embodiments, signal obstruction may be external to enclosures, caused by natural features such as hills, artificial features such as bridges or large buildings, and the like.

It is to be understood that fill-in retransmission is known, as applied in a variety of applications such as providing television and radio signals in steep valleys lacking line-of-sight alignment with broadcast transmissions, cellular telephone repeaters for homes and vehicles, and the like. Known retransmission services lack support for elliptical signal transmission.

It is to be understood that the term elliptical with reference to polarization describes the general case, wherein the axial ratio (AR, major axis divided by minor axis, voltage ratio, unitless) may have any positive value from one to infinity. Corresponding logarithmic (decibel) AR notation is not used herein; power ratio would be the square of the voltage ratio. The nominal case is circular polarization (CP is used herein for noun and adjective forms), wherein the AR is one; antennas with ARs up to about 10 are treated as elliptically polarized herein. Receiving antennas having ARs less than about 2.0 are readily producible, are typically capable of rejecting signals of opposite-handed elliptical polarization, and are characteristic of preferred receiving antennas for the present invention. The theoretical 20 dB difference in gain when receiving a CP signal between same-polarized and oppositely-polarized antennas is reduced as either the signal or the antenna deviates from respective ARs of one. For example, for an ideal CP signal (AR=1) directed toward two opposite-handed but otherwise identical receiving antennas, each with an AR of 2.0, the difference in received signal strength may be only 17.5 dB (same-handed antenna is 1.25 dB below nominal, opposite-handed antenna loses only 18.75 dB). Under the limitations indicated above, the terms elliptical and circular are used interchangeably herein except as noted; "degree of circularity" or a similar usage implies that the AR is greater than one by some amount.

In some embodiments, the broadcasting signal source with its associated tower 26, nominally omnidirectional, may be replaced by a directional transmitting system, or may be replaced by a satellite, a fiber optic signal carrier, or the like, wherein reception of the signal may additionally require a format or channel frequency converter between the receiving antenna 14 and the transmitting antenna 18 in order to provide a signal in the band of interest. Although the description herein of the invention focuses primarily on apparatus and methods for compensating for signal blockage within occupied buildings by rebroadcasting a signal, the alternate configurations indicated fall within the scope of the invention and may be preferred in some embodiments.

Similarly, the system 10 may be configured with a local programming source (video mixing board, clip storage, DVD player, modulator, etc.) in lieu of the receiving antenna 14. Such embodiments may be used in applications such as trade shows, for example, wherein the functionality of a consumer product is being demonstrated, but the broadcasting infrastructure for ordinary use of the consumer product is not yet available in the vicinity of the trade show. Such embodiments may also be used within schools, museums, military reservations, apartment complexes, office buildings, and the like to provide services corresponding to closed-circuit television as has heretofore been provided for stationary receivers and display devices.

The receiving antenna 14 may be of any CP design suited to the frequency band for which the invention is to be applied. In the embodiment shown in FIG. 1, the receiving antenna 14 is preferably highly directional in azimuth and elevation, and features CP of the same handedness as a CP signal transmitted by the broadcast antenna 26. Any known or future CP antenna type capable of receiving broadcast CP signals in the band of interest may be used in some embodiments, although the features of directionality and rejection of signals of opposite handedness (AR close to 1) will be shown to improve performance or to lower cost in some embodiments of the invention. An antenna 14 further exhibiting relatively uniform gain over a wide frequency range or substantially constant group delay over significant portions of the band of interest may be of benefit, potentially allowing a single design of receiving antenna 14 to be used for different channels in different installations or to be used with more than one channel in a single installation.

The amplifier 16 serves to establish a preferred signal power level and other attributes according to one embodiment. For some embodiments, it is possible to acquire a signal from the antenna 14 that has sufficient signal strength to obviate the amplifier 16. Nonetheless, it is anticipated that, in most embodiments, an amplifier 16 may be useful to assure consistent system-level performance over a plurality of installations. For example, an amplifier 16 may include, in addition to a gain stage 28, a filter 30 to attenuate signals outside the band of interest, render in-band signals more uniform, and compensate group delay, an automatic gain control (AGC) function 32 to maintain a regulated level of output signal strength over a range of input signal levels, or the like. Like the receiving antenna 14, a suitable amplifier 16 may exhibit wide bandwidth and uniform group delay, at least within portions of the band such as individual broadcast channels. Specific embodiments may exhibit these attributes to a varying extent.

An AGC function 32, such as that shown in FIG. 1, accepts unmodified signal input from an input signal line 20, provides a nominal level of amplification or attenuation, and outputs the signal to a filter 30. The filter 30 may be configured to remove out-of-band signal energy at least in part (bandpass), and may be further configured to adjust the relative phase and magnitude of spectral components not blocked, using passive, active, or multiple filter elements (all pass). The filter 30 output signal may closely resemble the signal that is desired to be radiated from the transmitting antenna 18, or may be configured to precompensate for distortion expected to appear in the gain stage 28 and signal line 22, such as by attenuating mid-range frequencies, introducing delay into low-range frequencies, and the like. A tap 34 on the line between the filter 30 and the gain stage 28 represents feedback to a control input 36 to the AGC 32, so that the applied signal level can be set according to the filter 30 output and thereby avoid in part errors caused by out-of-band signal energy. In some embodiments, such arrangements may cause artifacts such as AGC clipping. A passive front end filter before the AGC 32, alternative placement of the feedback tap, or another combination of filters, amplifiers, and like functions may be able to alleviate such phenomena at least in part. Typical AGC implementations average received signal energy over a period and over a frequency range, such as to limit artifacts associated with loud or quiet audio, bright or dark video, slow or rapid motion, transient variations in received signal strength, and the like. AGC for digital transmissions may compensate for different signal defects than AGC for analog transmissions.

As shown in FIG. 1, the receiving antenna 14 is carried on a mount 38 represented as separate therefrom. In such embodiments, the receiving antenna 14 may provide an attachment point for the mount 38. In other embodiments, the mount 38 may be integral with the receiving antenna 14. It is to be understood that other mounting arrangements that allow stable fixing of an antenna 14, including at least mounting to horizontal or vertical panels, clamping to struts at available angles, and attachment to other antennas, fall within the scope of the invention. Range of adjustment and durability of mounts 38 are preferably appropriate for system and application requirements, so that a mount 38 is able to orient and retain an antenna 14 in a desired direction with sufficient precision, in view of the antenna's directionality, to acquire a signal, and to provide stability and position retention without undue maintenance over a useful period of time. Similarly, the shape of the receiving antenna as shown in FIG. 1 is generic; any functional shape may apply to an embodiment. Likewise, the solid-line elements in FIG. 1 show an embodiment wherein the receiving antenna 14 and associated interconnecting signal line 20 are exposed to whatever weather may be present outside the structure 12, with a roof-mounted pass fitting 40 serving to feed the line 20 into the structure 12. It is to be understood that other pass fitting 40 arrangements fall within the scope of the invention, and that either a weather-resistant antenna 14 design or a protective radome 42 (shown dashed) of any style fitted over an antenna 14 having an unspecified extent of weatherproofing may be preferred. A second radome 44 and associated strut 46, located inside the structure 12, are also shown dashed in FIG. 1.

Interconnecting signal lines 20 and 22 in the embodiment shown are coaxial cables suited to the frequency range, bandwidth, and power levels of the signals. Typical signal lines 20 and 22 suitable for signal power from milliwatt levels to levels on the order of 100 watts may be coaxial types such as RG-8/U, a relatively low-loss 50 ohm cable material of moderate size and adequate performance over UHF frequencies. Armored cable, or cable of types that exhibit different levels of loss, noise, group delay, isolation, uniformity over frequency, impedance, or other attributes, may be preferred for some embodiments.

In the schematic FIG. 1, the receiving antenna 14 is shown separated from the amplifier 16, with a first signal line 20 carrying the low-level signal into the structure 12. The amplifier 16 supplies a gain-adjusted and filtered signal to the indoor broadcasting antenna 18 by a comparatively short second cable 22, so that some characteristics of the second signal line 22, such as noise and group delay, may be relatively unimportant when compared to the corresponding characteristics of the first signal line 20. In other embodiments, the amplifier 16 may be configured within a single, roof-mounted envelope with the receiving antenna 14, for example, so that the first signal line 20 may be quite short, even to the extent of being integral with the antenna, thus having characteristics of striplines or other conductor types. The second signal line 22 in such embodiments may be relatively long, possibly requiring precompensation by the filter 30 for example, in order to assure desirable signal characteristics at the indoor broadcasting antenna 18. In still other embodiments, the active electronic functions may be split between a roof-mounted part and a second part proximal to or integral with the indoor broadcasting antenna 18, or may be fully embedded within the assembly that includes the indoor broadcasting antenna 18.

Known configurations for providing electrical power to circuitry to which providing separate power feed lines is inconvenient include "power tee" devices, wherein an external power supply acquires power from a premises outlet, for example, converts the power to a readily usable form such as a low direct current (DC) signal, and applies the DC between inner and outer conductors of a coaxial line such as the second cable 22 in FIG. 1. The power tee is preferably a low-loss pass through section in the cable 22 with a trap that blocks radio-frequency (RF) signals from entering the DC power supply but passes the DC onto the cable 22, while introducing negligible RF losses into the cable 22. The DC applied to the cable 22 may then be used to provide power to active electronic devices, such as the amplifier 16 shown in FIG. 1.

Figure 2:
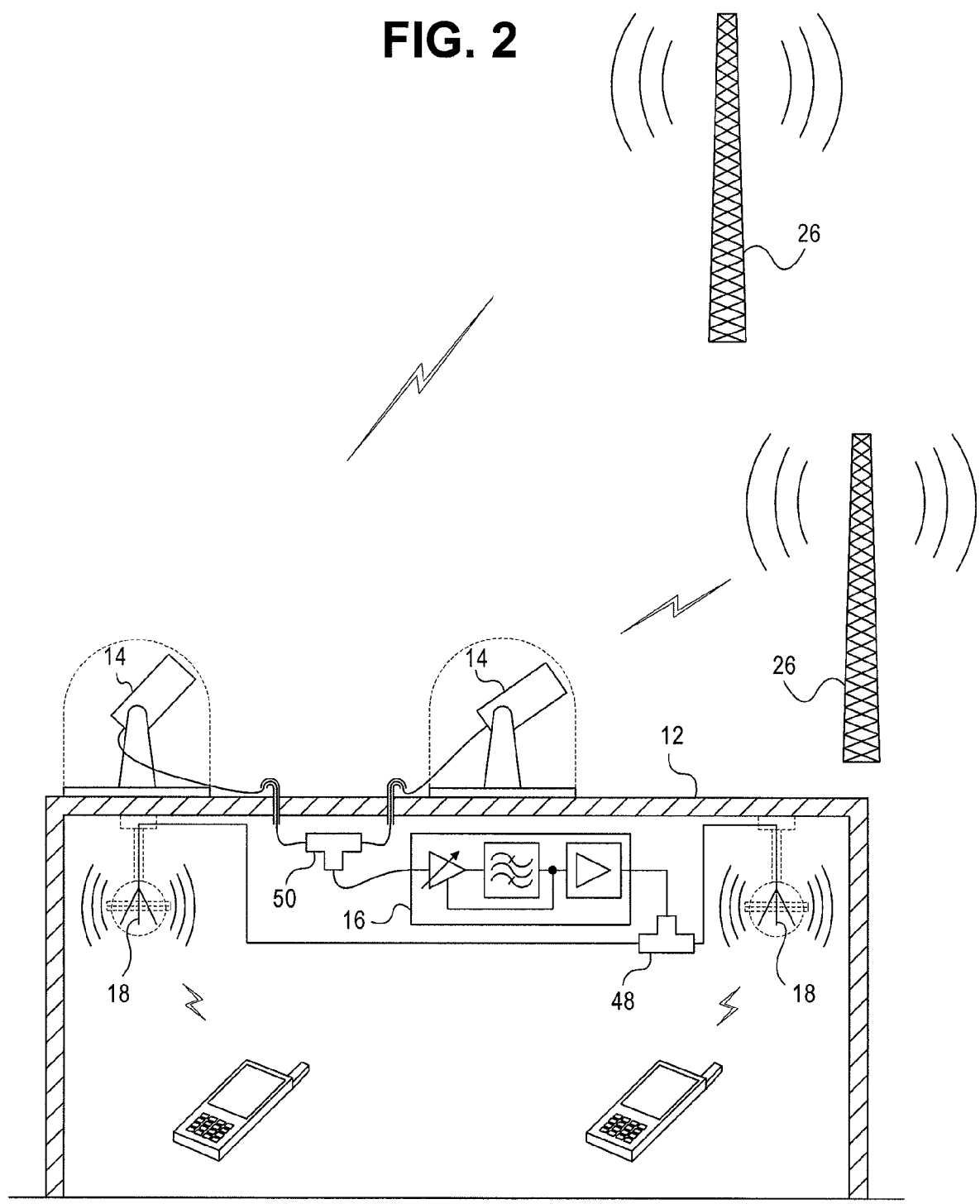
FIG. 2 is a schematic diagram of another broadcast repeater system according to the invention.

FIG. 2 shows a plurality of variations on the embodiment of FIG. 1. In some embodiments, a single receiving antenna 14 may be used with more than one indoor broadcasting antenna 18, with signal energy from the amplifier 16 distributed to the indoor broadcasting antennas 18 using a power splitter 48, for example. In other embodiments, more than one directional receiving antenna 14, aimed toward a plurality of broadcasting antennas 26 operating on different channels, may be used with a combiner 50 in the amplifier 16 feed path to permit channels to be rebroadcast together within the structure 12. In still other embodiments, two or more amplifiers 16 may be fed from a receiving antenna 14, such as to supply signals to widely separated areas within an extensive mall. In yet other embodiments, the interconnecting signal lines 20 and 22 may be fiber optic lines in whole or in part, or may include wireless signal transfer in order to pass signals between spatially separated active electronic sections, provided frequency conversion and electrical power feed for sections so linked are met.

The CP receiving antenna 14 may be able to receive an acceptable broadcast input level despite installation inside the structure 12, particularly in configurations wherein the receiving antenna 14 has high gain and the structure 12 allows some penetration of the signal of interest, such as through a skylight, even if ordinary users cannot receive a robust signal in the same location. This may allow an embodiment to avoid roof or wall penetration, to locate an entire rebroadcast facility at a discrete site (i.e., collocate receiving and transmitting parts), to preserve portability, to establish a minimally-configured temporary setup (such as during a special marketing event), or the like. In some such embodiments, the receiving and transmitting antennas as well as the active electronics may be integrated within a single envelope. In embodiments such as these, signal rejection due to opposite polarization handedness between the CP receiving and transmitting antennas, augmented by shielding as needed, may be of particular interest.

Installation of the omnidirectional CP indoor broadcasting antenna 18 may be, for example, near a suspended ceiling in a retail establishment within an enclosed shopping mall, fed from the roof-mounted directional receiving antenna 14. However, any convenient spot within the structure 12 may be adequate for placement of the indoor broadcasting antenna 18, in view of the low broadcast field strength required for operation—for example, beneath a table, atop a kiosk in a corridor, above a suspended ceiling, within a storeroom, or in another location. The radome 42 may be untinted, or may be omitted. The low signal level for which the indoor broadcasting antenna 18 is intended in many applications makes it substantially safe around living organisms, although potentially fragile itself. Reflectors, such as structural members, metalized bags, clothing decorations, and the like, and diffractive masses, such as people, masses of petroleum distillates, and the like, may affect propagation.

Figure 3:
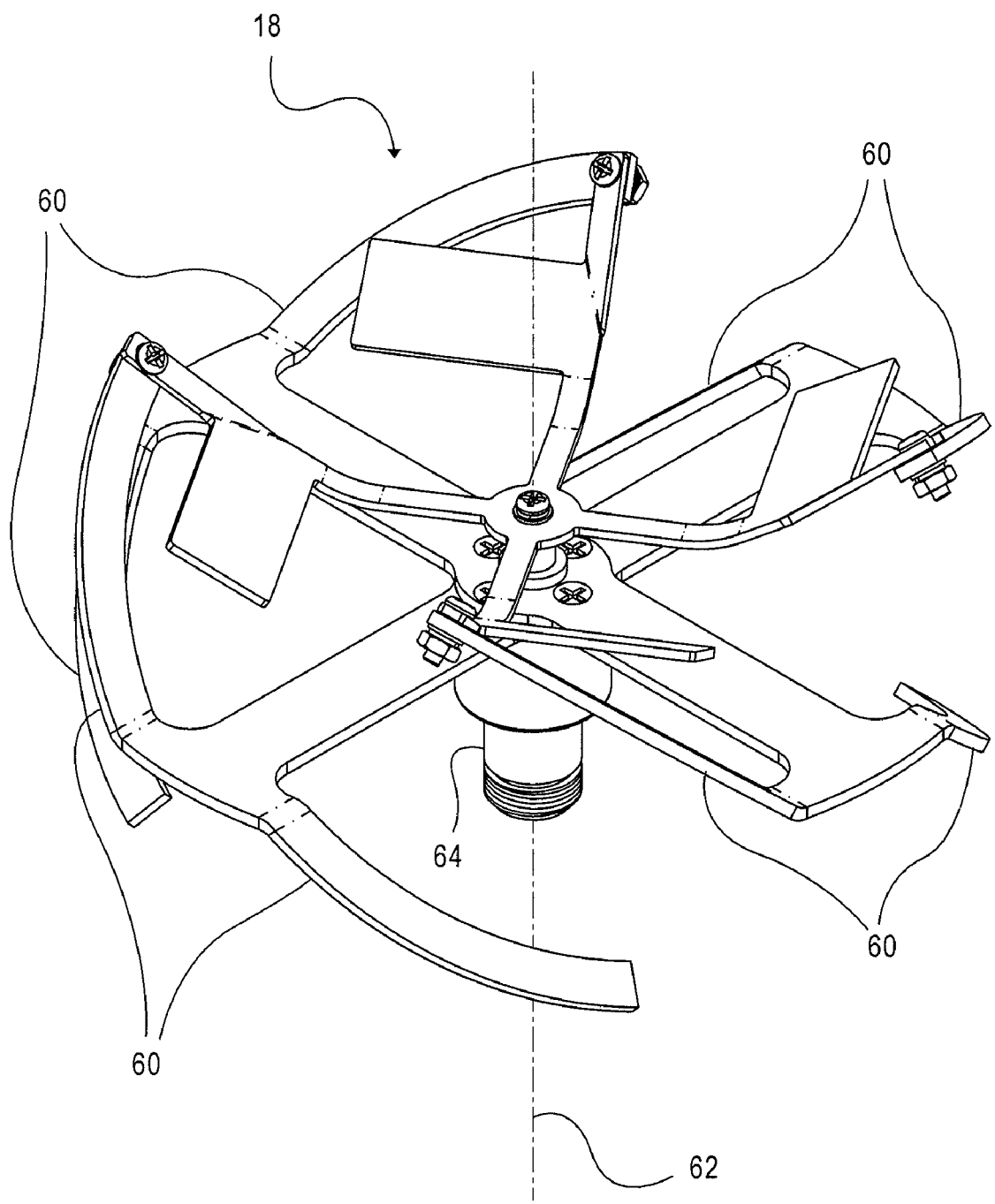
FIG. 3 shows a perspective view of a transmitting antenna suitable for use as part of a broadcast repeater system according to the invention.

FIG. 3 shows an embodiment of the omnidirectional CP transmitting antenna 18. The antenna 18 includes dipoles 60 in the shape of quasi-helices, referred to a vertical axis 62 through the antenna, of handedness opposite to that of the radiating tower 26 for which the transmitting antenna 18 can form an in-structure repeater.

As used herein, the term quasi-helix contrasts a shape that is a true helix, that is, a curve advancing uniformly with rotation at a constant distance from a screw axis, to a dipole formed to approximate a planar arc, wherein the plane of the arc is tilted with respect to an antenna axis 62 passing through the plane of the arc at a point such as the center of the arc, rather than being perpendicular to the axis 62. Variations on a uniformly arcuate form for the individual quasi-helices may include substantially arcuate, planar dipoles displaced, by parts or entirely, out of a plane perpendicular to the antenna axis to realize an approximation of center-grounded, single-end-driven helical dipoles. Other variations may include approximations of an arc by a series of straight segments, elliptical arcs, arcs centered on points other than the antenna axis 62, and the like. The variations described below with respect to FIGS. 5, 6, and 8-11 are included in the term quasi-helical as employed herein.

Figure 7:
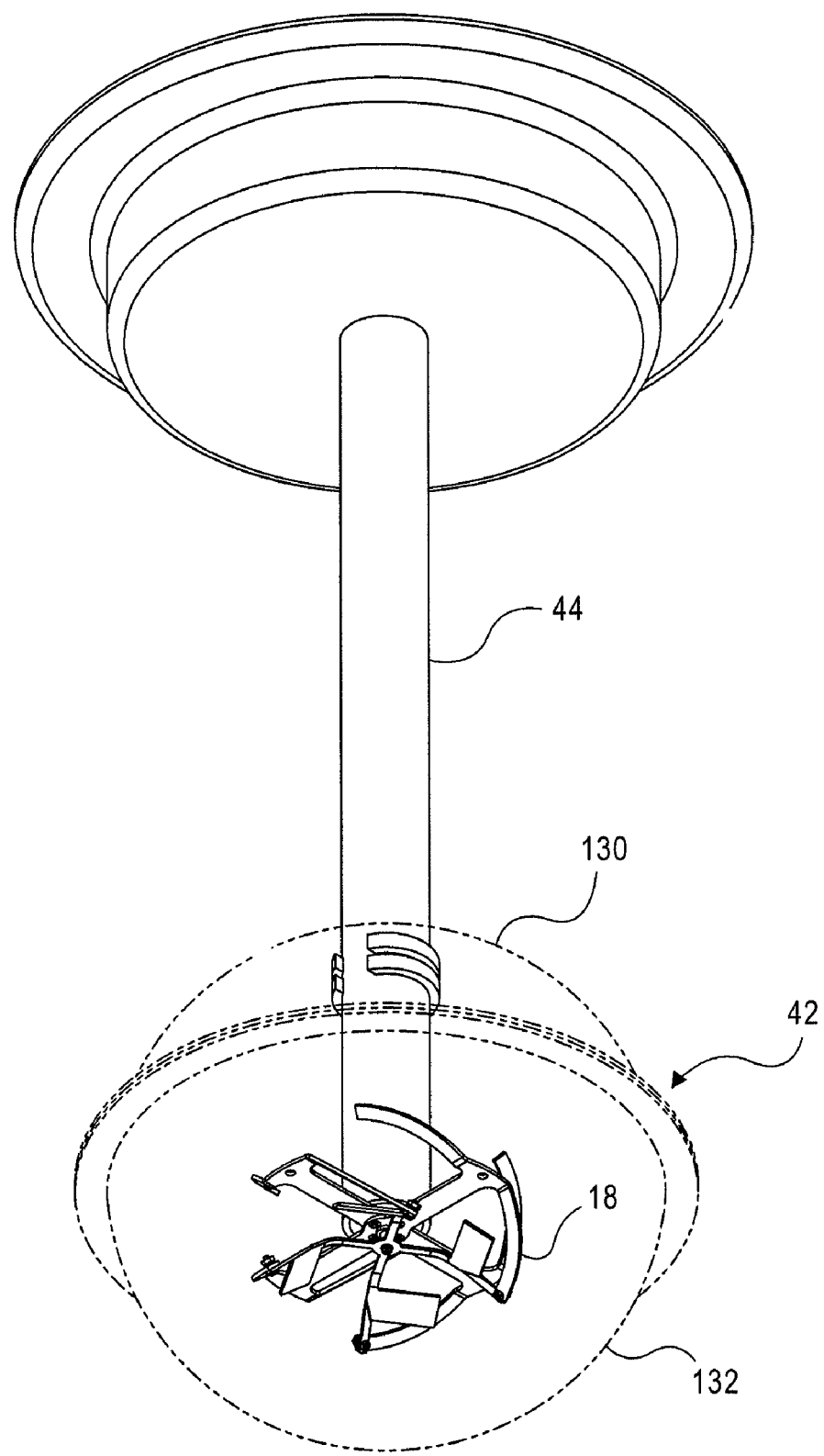
FIG. 7 is a transmitting antenna according to the invention, including a concealing enclosure.

The power level of the CP transmitting antenna 18 may be very low in at least some embodiments; in such embodiments, dimensions related to corona and arcing may be viewed as generally non-critical. Physical components in at least some embodiments may not be subjected to significant environmental stresses such as shock, vibration, temperature fluctuation, pollution, condensing moisture, salt spray, and the like. As a consequence, material selection and fabrication methods may be cost-driven to a greater extent. The antenna 18 may be low in weight by virtue of a low-power and low-stress design, along with providing low gain when configured with a small number of bays, in view of the modest intended range of some embodiments of the system. Low weight permits the antenna 18 to be mounted inconspicuously, such as within a tinted security camera enclosure, as shown in FIGS. 1, 2, and 7. The antenna 18 of FIG. 3 includes four quasi-helical radiators 60, positioned with approximate fourfold rotational symmetry about the antenna axis 62, excited from a central coaxial coupling body 64.

Typical receiving antennas on devices 24 to which the antenna 18 is anticipated to transmit are linearly polarized, and thus have sensitivity to CP signals about 3 dB below that of otherwise comparable but circularly polarized receiving antennas. Linearly polarized receiving antennas, being nearly orientation-insensitive as well as signal polarization handedness insensitive, are useful for mobile or handheld applications, given transmitted CP signal power sufficient to provide a specified signal strength, such as within a structure 12.

The opposite-handedness of the signal from the radiators 60 compared to that of the signal from the radiating tower 26 causes the signal to be largely undetectable by the receiving antenna 14 of FIG. 1—specifically, attenuated by approximately 20 dB compared to a same-handed signal. This characteristic, in combination with the directionality of the receiving antenna 14 and the low radiated signal amplitude for which the system is intended in at least some embodiments, can provide a system 10 that is largely immune to feedback-induced signal defects. For example, a strong mirroring reflector, such as a metal wall of a building separated from the system 10, in combination with the existence of an opening in the structure 12, through which a signal was free to pass outward, with the opening aligned with the reflective wall and with the wall both positioned within the beam of the receiving antenna 14 and critically oriented, may be required even to establish an interfering signal path. The receiving antenna 14 and amplifier 16 may require sufficient gain to sustain oscillation.

Systems and components in accordance with the invention disclosed herein have a nominal frequency band of operation centered at approximately 724.6 MHz. However, the invention applies equally to other bands. For example, the apparatus size may be scaled downward by roughly 25%-30%, which raises the center operating frequency to around 1.0 GHz, or may be increased in component size by a comparable amount, which lowers the center operating frequency to approximately 500 MHz. Any such application may require the availability of a specific channel for licensing, as well as requiring amplifiers, filters, and other components compatible with operation at the indicated frequency. Where not limited to transmitting by the inclusion of an output-only RF amplifier within its structure, the CP antenna 18 may be usable in transceiver applications as well as broadcast/re-broadcast applications.

Figure 4:
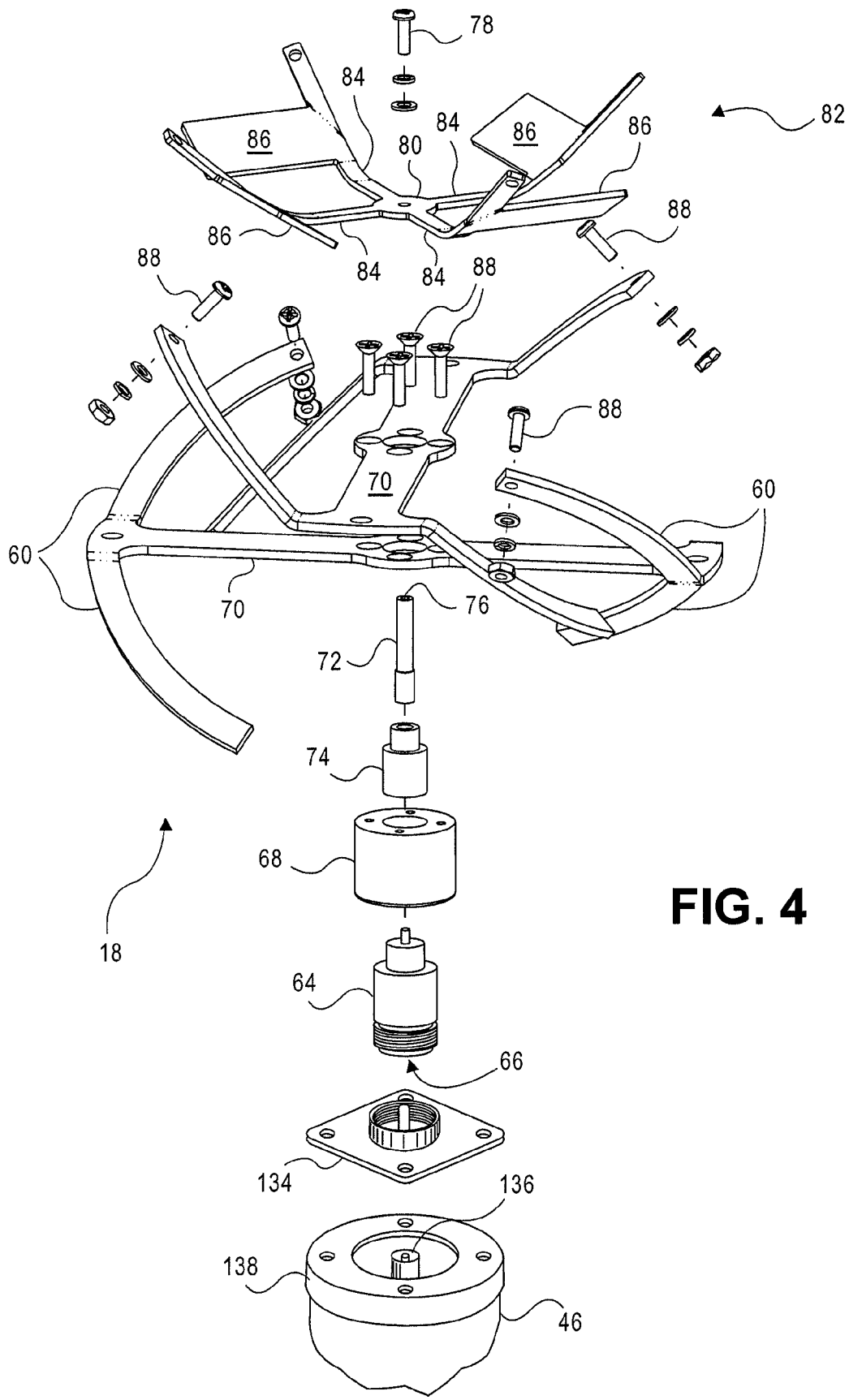
FIG. 4 shows an exploded perspective view of the transmitting antenna of FIG. 3.

FIG. 4 is an exploded view of the CP antenna 18 of FIG. 3. An outer conductor of a coupling body 64 terminates, distal to an input port 66, at a conductive and mechanical connection fitting 68 to two conductive cross arms 70. The cross arms 70 have the electrical potential of one conductor of the interconnecting signal line 22 shown in FIG. 1, which conductor is the outer conductor of a coaxial cable in the embodiment shown, so that the cross arms 70 provide a local reference potential. Impedance matching as sensed at the input port 66 allows the antenna to approximate a nonreactive unbalanced line termination. From the coupling body 64, a feed line in the form of an extension 72 to the center conductor thereof extends past an insulator 74 to terminate in the form of a threaded shoulder 76; a screw 78 attaches a central node 80 of a manifold feed plate 82 to the threaded shoulder 76 in the embodiment shown. Feed blades 84 of the manifold feed plate 82 extend from the central node 80 to feed points proximal to upper tips of the quasi-helical dipole radiators 60, whereto the blades 84 are connected electrically and mechanically. Tuning paddles 86 are shown on the feed blades 84. The tuning paddles 86 may be sized, dimensioned, and positioned to realize prescribed impedance and coupling efficiency along with substantially nonreactive antenna termination as measured at the input port 66.

It is to be understood that each detail of construction, fabrication, and assembly in the embodiment show is representative, and alternative implementations may be preferred in other embodiments. For example, various screws 88 may be replaced by rivets or spring clips, by solder, braze, or weld joining, or by other connection methods, including forming from fewer pieces so that no connection is required. Similarly, the tuning paddles 86 are shown as integral parts of the manifold feed plate 82 along with the feed blades 84; the blades 84 and paddles 86 may differ in size, shape, and position from those shown, and may be assembled from a plurality parts, in other embodiments.

In some embodiments, as indicated above, a structure corresponding to the coupling body 64 and the mechanical connection fitting 68 as shown in FIG. 4 may include an internal void of size sufficient to incorporate an active or passive electronic function such as an amplifier, filter, or the like, shown in FIG. 1 as a part of the amplifier 16. Such a function may receive any power required for active circuits from another electronic component in the system, such as another amplifier or filter proximal to or integral with the receiving antenna 14. Apparatus components 134, 136, and 138 are addressed below with reference to mounting to strut 46.

Figure 5:
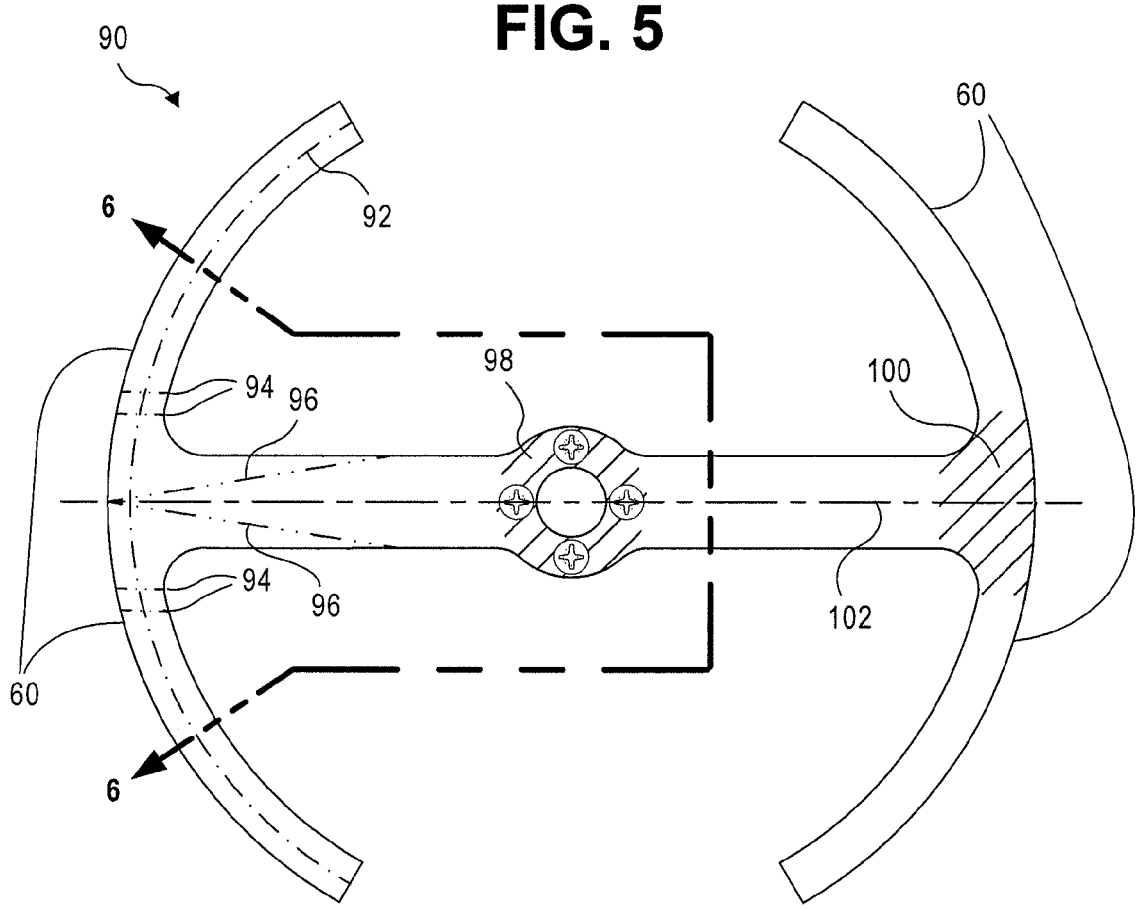
FIG. 5 is a layout view (unbent) of a single component part from a transmitting antenna, according to the invention, that includes two dipoles and associated cross arms.

FIG. 5 shows, in a layout view, a single blank 90 of the antenna 18 prior to forming. The dipole radiators 60, shown in FIGS. 3 and 4, if formed from flat sheet stock, such as by cutting and bending, may appear substantially as shown in FIG. 5 before bending, and may have a substantially arcuate shape 92 prior to bending, with each two opposed dipoles 60 and their connecting cross arm 70 formed from a single piece, such as by cutting. Nominal bending lines 94 in FIG. 5 are compatible with the arrangement of FIGS. 3 and 4. It is evident as shown in FIGS. 3 and 4 that two such pieces may be assembled at right angles and attached to the manifold feed plate 82, the coupling body 64, and the mechanical connection fitting 68 of FIG. 4 to form a transmitting antenna 18. The slightly asymmetrical orientation of the dipoles 60 may serve to further detune the antenna 18, broadening its effective bandwidth.

In other embodiments, substantially equivalent performance may be achieved if the alternative bending lines 96, also shown in FIG. 5, are used. In other embodiments, the cross arm 70 may be twisted, such as by clamping the region of a hub 98 of the blank 90 and one of the midpoint reference nodes 100 of the dipoles 60 and rotating the clamped parts 98 and 100 oppositely about an axis 102 until a desired extent of inelastic deformation establishes a shape broadly comparable to that of the radiators of FIGS. 3 and 4. In yet other embodiments, a preferred shape may be realized by cutting or punching blanks similar to the component blank 90 of FIG. 5 out of a conductive and at least somewhat malleable sheet material, then drawing (coining, stamping, etc.) the blanks to a shape similar to that of the components of FIGS. 3 and 4 with a press or similar forming tool. The hub 98 may be upset from the plane of the cross arm 70 in some embodiments, so that two formed and stacked components may be assembled with the respective dipoles 60 either coplanar or further offset from being coplanar. Similarly, the reference nodes 100 of the dipoles 60 may be offset from the hub 98 to a greater extent, so that the tilted reference planes associated with the dipoles 60 are appreciably displaced from the plane of the hub 98.

Figure 6:
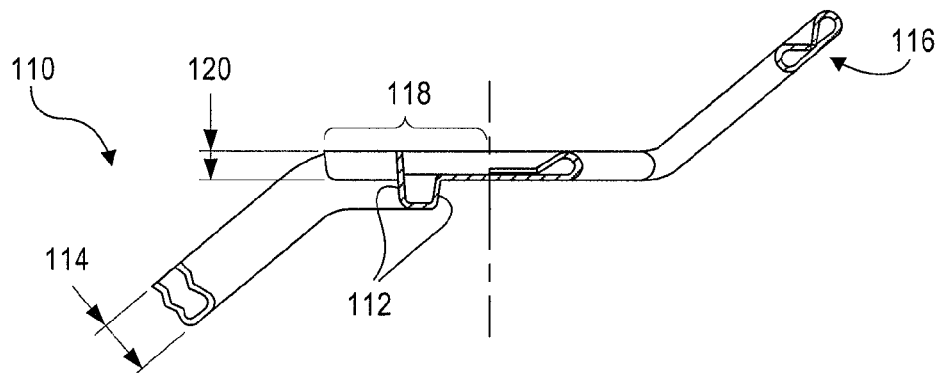
FIG. 6 is a section view of alternate embodiments (formed) of the component part shown in FIG. 5.

FIG. 6 shows two section profiles 110 formed from thin sheet stock based on the shape shown in FIG. 5, each of which is an alternative to the profile shown in perspective in FIG. 4. Within limitations established by a requirement for satisfactory RF performance, and in lieu of using thicker sheet stock to provide a preferred extent of rigidity, a stamping process may establish a structure based on flanges 112 and relatively deep sections 114, as shown on the left side of FIG. 6. Alternatively, a rolled profile 116 may be provided, as shown on the right side of FIG. 6. It is to be noted that the upset referred to in the above discussion of FIG. 5 is depicted on the left side of FIG. 6 with reduced flange thickness in the hub region 118, so that a second component assembled inverted to the component shown may have substantially coplanar dipoles 60 rather than dipoles 60 offset by the thickness of the hub 120, with the hub region 98 and dipole midpoint area 100 of FIG. 5 at least slightly offset by the forming process from being coplanar.

FIG. 7 shows a CP broadcasting antenna 18 within a radome 42 that resembles well-known styles of surveillance camera housings. Such housings are commonly tinted to obscure the (possibly time-dependent) view direction of a (possibly motorized) camera, and are ubiquitous in public places and retail establishments. For these reasons, a radome 42 of this or a similar style, whether suspended on a strut-style mount 44 as shown, mounted flush to a surface, or otherwise attached to a surface within the structure 12, may render a rebroadcasting system 10 according to the invention effectively unnoticeable. As a corollary, the high volume of manufacture of housings and struts of such types potentially reduces the cost of providing the radome 42 and mount 44. The cameras for which such housings are ordinarily provided may need to be robustly mounted therewithin, such as to provide stable imaging and motorized pan/tilt/zoom/focus/aperture adjustment absent weight balance and dynamic counterbalance. Adaptation of such housings to provide positioning and retention of the broadcasting antenna 18 in an orientation that supports signal propagation may present minimal difficulty for many embodiments.

The housing applied as a radome 42 is shown as including top 130 and bottom 132 hemispheres, although other readily-available forms, such as a bottom hemisphere 132 extended upward as a cylinder of equal diameter, may be suitable. Such housings are preferably made from a low-loss dielectric material, such as acetate, butyrate, polycarbonate, or polyvinyl chloride. Stipulation that parts be nonmetallic may preferably include any fastenings. A radome 42 may be tinted, translucent, or optically opaque. An applied mirror finish or other surface coating, such as metallization or paint, may result in degradation of RF emission to an extent unacceptable for an application, depending on the coating material. It is to be observed that surface coating or inclusion of conductive or semiconductive filler in a material selected for a radome 42 may affect antenna attributes, including at least impedance, radiation resistance, standing wave ratio, bandwidth, and center frequency. Such radome 42 properties may also affect propagation pattern to an appreciable extent. Intrinsic dielectric properties of nonconductive radome 42 materials, such as dielectric constant and loss, may also affect propagation. For thin, uniform walls, large radome 42 diameter, and relatively low dielectric constant and loss, effects may be slight, while thick and/or irregular walls, proximity to the antenna, high dielectric constant, or highly lossy material may appreciably alter performance.

Figure 8:
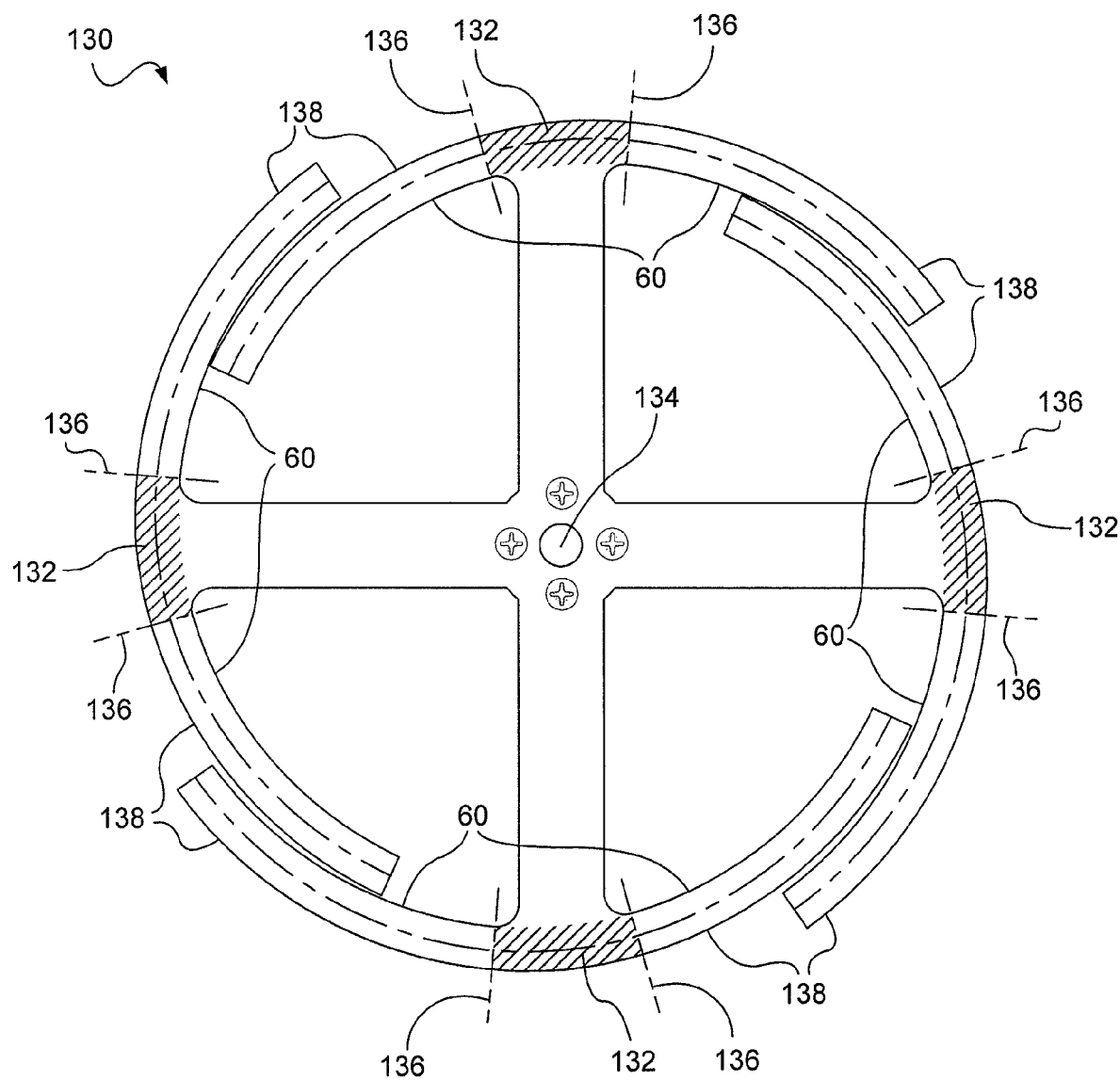
FIGS. 8-11 are layout alternatives for the component shown in FIG. 5.

FIG. 8 shows a four-around blank 130, a variation on the two-dipole blank 90 of FIG. 5. In this blank 130, the dipoles 60 are the same size—radius, arc length, thickness, and width—as those of FIG. 5, but are individually rotated so that the reference nodes 132 of the respective dipoles 60 are not centered on an axis of symmetry passing through the center 134 of the blank 130. The bend lines 136 are likewise rotated by an amount sufficient to tilt each segment 138 to render the electrical performance similar to that of the two blanks 90 of FIG. 5 as combined in the antenna 18 of FIG. 3.

Figure 9:
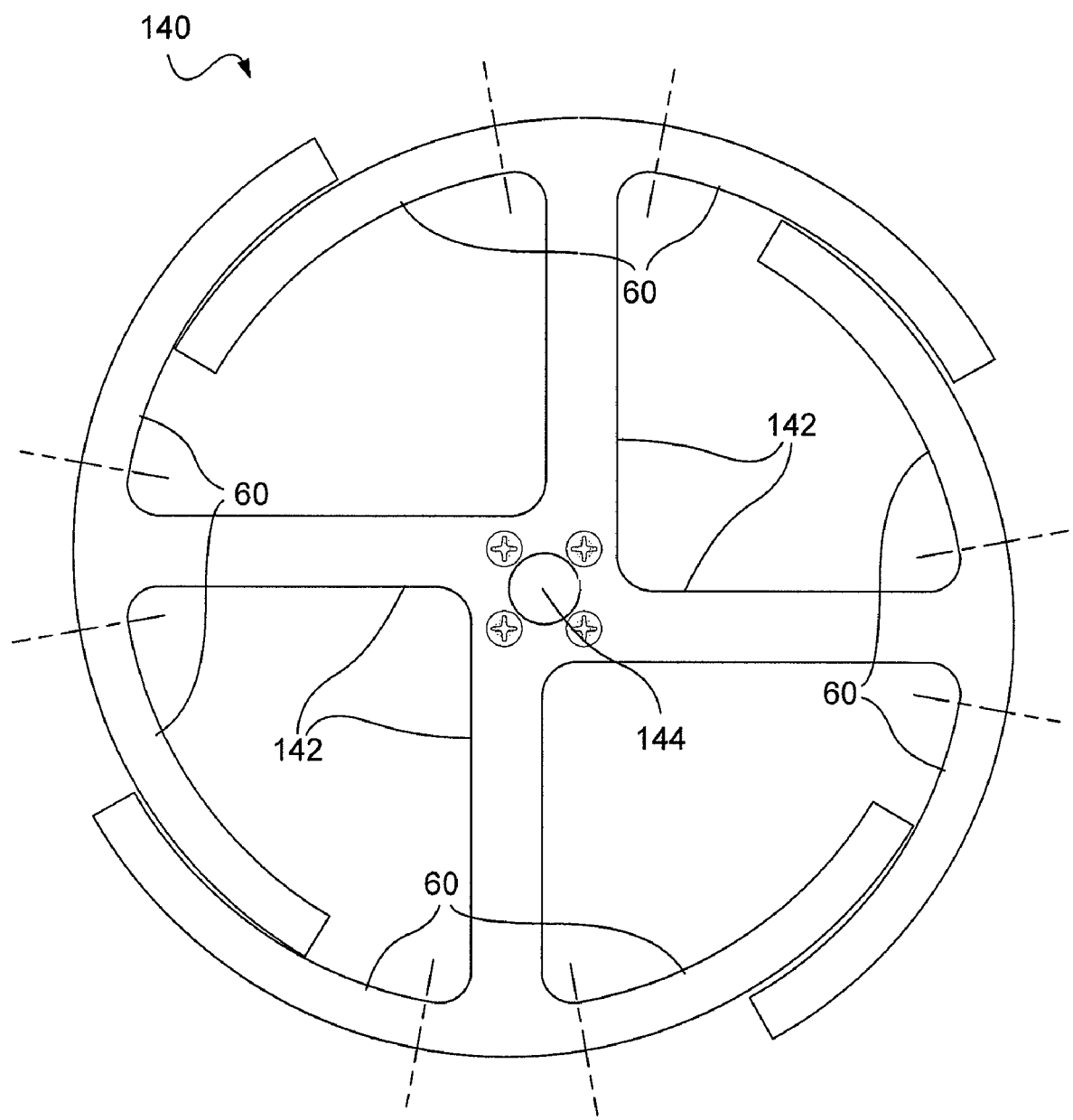

FIG. 9 shows a blank 140 substantially similar to that of FIG. 8, but with cross arms 142 that are not straight-line connections between the center 144 and the dipoles 60. Effects of variations in structural arrangements such as the offset shown in FIG. 9, curved cross arm shape, or the like, may affect propagation, loading, and other properties, and may require simulation and/or fabrication and test for design verification.

Figure 10:
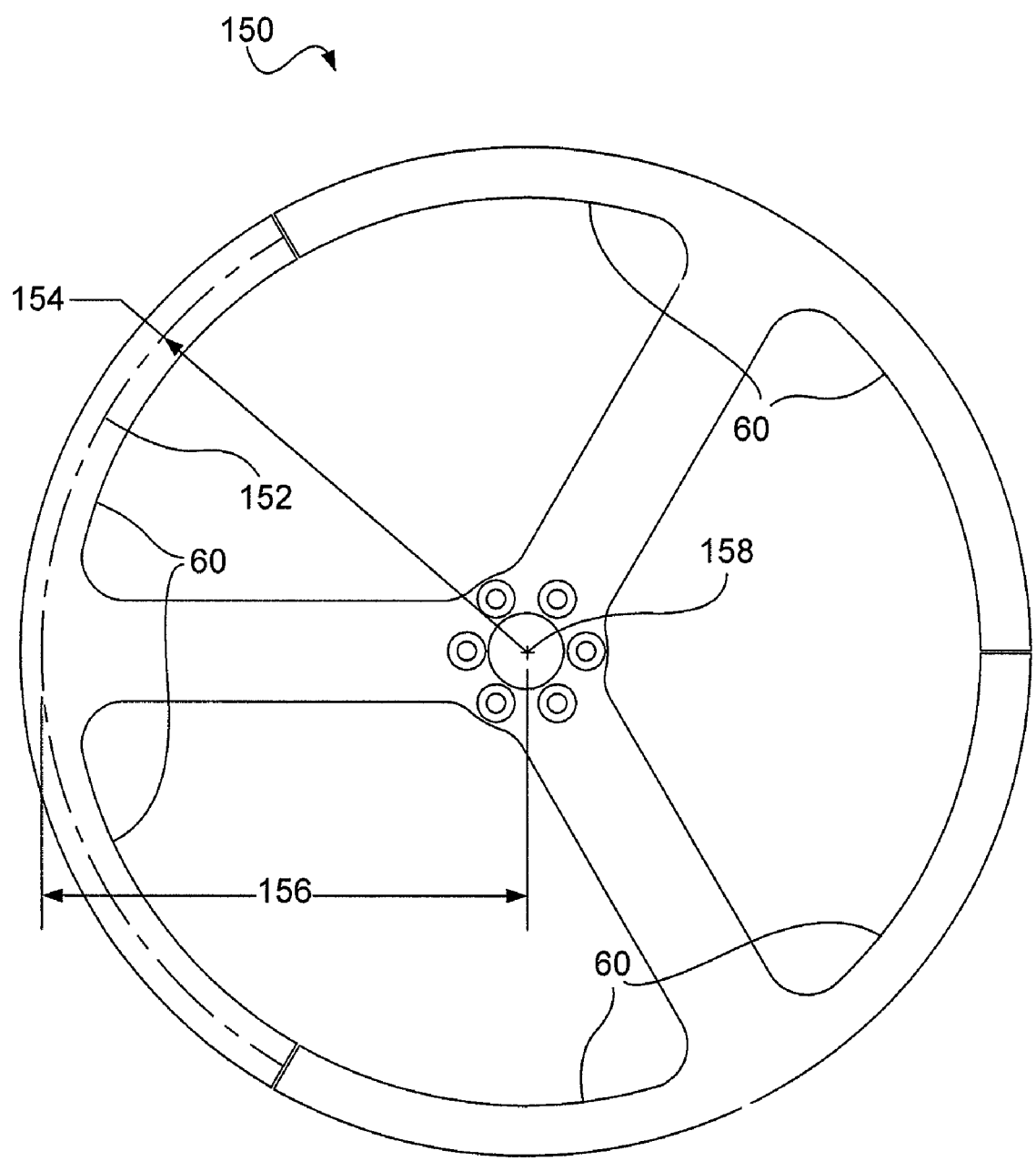

FIG. 10 shows a three-around blank 150 that may be realized with zero overlap, and thus with no rotation of individual dipoles 60 to achieve a desired dipole arc length 152, arc radius 154, and cross arm length 156 from the center 158. Such a blank 150 may be used alone, with the arc length 152, arc radius 154, and cross arm length 156 parameters selected for a desired radiation resistance, or may be one of two in a six-around configuration, for example, which may require alteration of one or more of these parameters.

Figure 11:
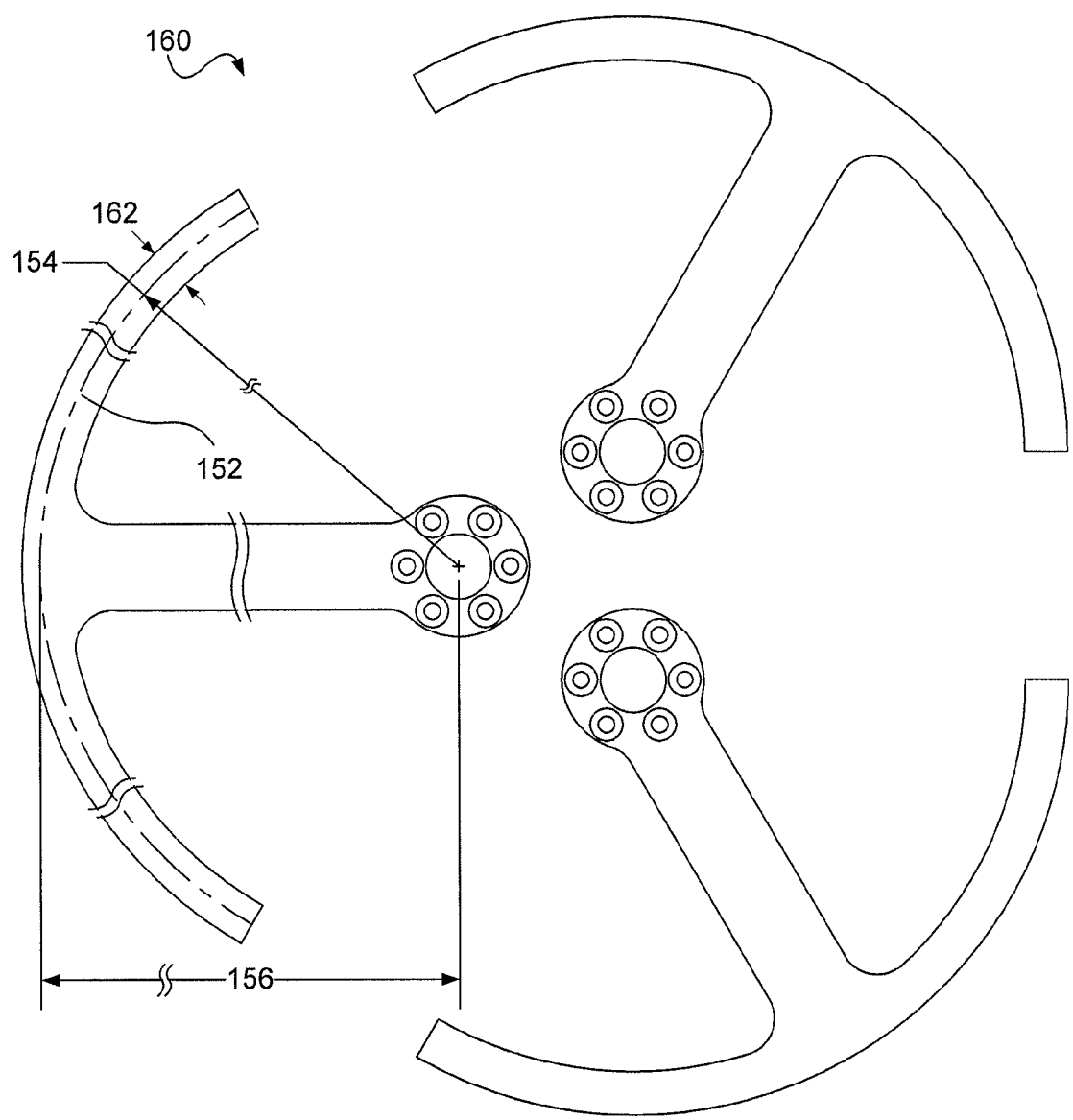

FIG. 11 shows three single-dipole blanks 160 that may be used alone or in combination by stacking. The parameters of FIG. 10 remain relevant, as arc length 152 remains largely a function of frequency, but arc radius 154 and cross arm length 156 are generally dependent to at least some extent on the number of dipoles in each bay.

For any of the above-described embodiments, arc length 152 may be proportional to dipole surface area, rather than simply to frequency. A simple quarter-wave dipole, end-driven, arcuate, grounded at its center, and fabricated from very thin wire—negligible circumference in proportion to dipole wavelength—may have an optimum length, while an otherwise identical dipole fabricated from fairly thick tubing, for example, requires an arc length appreciably shorter than a quarter wavelength in order to be tuned to the same frequency. The thicker dipole also has a lower "Q", that is, wider bandwidth. The embodiments shown herein, if cut from sheet aluminum of a particular gauge and provided with a particular dipole width 162 perpendicular to the gauge and arc length dimensions, or if further drawn to achieve a section profile such as those shown in FIG. 6 with a particular dipole width 162 and an effective gauge after forming, may have a tuned arc length that decreases as effective dipole circumference increases.

Each configuration shown constitutes an array of n arcuate dipoles, for n at least one, with each dipole disposed as a quasi-helical radiator with reference to a vertical axis. The respective dipoles are excited synchronously from a manifold that distributes the signal from a manifold hub using feed blades and tuning paddles. The midpoints of the respective dipoles are placed at a common potential, with each dipole supported by and connected to a central hub. The n dipoles may be fabricated in m groups of p dipoles each. For example, FIG. 3 shows four dipoles (n=4), with each two fabricated together (p=2), so that the dipoles are contained on two components (m=2). FIG. 8 shows four dipoles per component (p=4), and can be used alone or assembled in a stack of two (m=1 or 2) in an eight-around configuration (with adjusted dimensions) (n=4 or 8). FIG. 11 shows one dipole per component (p=1), and can be assembled in a stack (with adjusted dimensions) (m=1, 2, 3, or 6) without altering the indicated hole pattern, so that the total number of dipoles is any of one, two, three, or six (n=1, 2, 3, or 6). Alteration to the hole pattern shown in any of FIGS. 8-11, along with the manifold 82 configuration of FIG. 4, is likewise feasible in order to select a number of dipoles.

Each of the transmitting antennas 18 shown herein is compatible with positioning two or more substantially identical antennas in a vertically stacked configuration, effectively forming multiple bays that increase gain in a plane perpendicular to the antenna vertical axis in exchange for decreased signal strength away from that plane. Power splitters 48, as shown in FIG. 2 for separated antennas 18, may feed individual bays in such multiple-bay antennas. It is preferable in many embodiments that corresponding dipoles in respective bays be vertically aligned, that is, that reference nodes of corresponding dipoles fall on axes parallel to the antenna vertical axis. Vertical spacing between bays, typically one wavelength of the antenna center frequency, may be specified for maximum in-plane gain, or may be varied to provide beam tilt or other adjustments. A plurality of transmitting antennas 18, positioned horizontally inside the far field threshold, may also interact, and may realize signal reinforcement, cancellation, and varying polarization circularity with azimuth. Non-symmetrical antennas, realizable, for example, by stacking a plurality of the dipole and cross arm elements of FIG. 11 without rotational symmetry, may produce radiation patterns that vary with azimuth in both signal strength and circularity.

It is well established in the art that corona is a consideration at extreme altitude (low atmospheric pressure, long mean free path) and high voltage. Corona susceptibility is aggravated by the presence of sharp points and edges on charged conductors. With the exception of application of the invention for broadcast or bidirectional communication from free-flying weather balloons and other extreme-altitude environments, it is not anticipated that corona can lead to appreciable performance degradation. Nonetheless, it may be desirable for some applications to at least provide the greatest readily realized radii for all edges and corners.

Short distances between differentially-charged conductors, high voltage, and accumulated contamination along insulators separating conductors can contribute to transmission noise and transmitter malfunction associated with arcing. When used for low power applications and housed within radomes 42, a broadcasting antenna 18 and associated cables 20 and 22 of a system 10 according to the invention are at slight risk of arcing. Used at higher power, exposed, and subjected to contamination, such as near a restaurant kitchen ceiling or outdoors near a contaminant-rich exhaust stack, the broadcasting antenna 18 is potentially susceptible to performance degradation due to arcing. This degradation may be delayed somewhat by modifying the insulator 74 of FIG. 4, increasing its surface path length by adding convolutions to the basic shape. Placing the antenna within a radome 42 as shown in FIGS. 1, 2, and 7 may be preferable for arc prevention in many embodiments.

Low emitted power of some CP transmitting antennas 18 according to the invention permits emphasis on low material cost. For example, two dipole pair components (blanks 90) and a manifold feed plate 82 may be formed from sheet aluminum of an alloy and thickness selected for compatibility with the fabrication methods chosen (such as shearing, punching, sawing, and/or drilling for shape, sandblasting for finish, bending for profile definition, and heat-treating and anodizing for stability), where the product so fabricated is self-supporting. In other embodiments, thinner sheet metal stock formed to realize a profile such as one of those indicated in FIG. 6 may further reduce weight and material cost without appreciably affecting electrical performance or durability. Steels and other alloys may perform adequately in some embodiments.

In still other embodiments, injection-molded, vacuum-formed, die-cut, or otherwise shaped plastic (polymerized styrenes, urethanes, epoxides, phenolic resins, or the like) that may include a blowing agent (i.e., be foamed), and that may support overlay with a conductive coating, include a conductive filler, or exhibit, as prepared, a sufficient extent of intrinsic conductivity, may be used to form a radiative structure meeting electrical performance requirements. In such embodiments, molding into a final shape substantially similar to that shown in FIG. 3, for example, may be a preferred forming method, potentially merging at least the two dipole pair components into a single component while substituting molding or other forming processes for metal fabrication steps.

The physical components in at least some embodiments may not be subjected to significant environmental stresses such as shock, vibration, temperature fluctuation, pollution, condensing moisture, salt spray, and the like, so that the intrinsic ruggedness of antennas intended for exposure to weather extremes, for example, may be eased. In particular, for nominal indoor, in-radome 42 configurations, mechanical stress may be negligible. For some individual devices, however, conditions may include mounting proximal to heating-ventilation-air conditioning (HVAC) compressors, exhaust fans, or other sources of vibration, heat, or moisture, potentially subjecting a unit to prolonged and repeated mechanical stress, significant thermal loading, condensation, and the like. In anticipation of such conditions, construction, including cable connector strain relief, may preferably be more robust than nominal use indicates.

In some embodiments, the coupling body 64, shown as an N-type barrel connector in FIGS. 2 and 3, may be beneficially reduced to F-type, SMA, or another style as power loading, electrical characteristics, and physical stress permit and economy dictates. In other embodiments, the customary guideline to separate mechanical from electrical mounting may be set aside, and the coupling body 64 may be used as a mounting fitting, mating with a flange-type female-shell connector 134 as shown in FIG. 4, with the connector 134 terminating a coaxial line 136 and attached by a suitable hardware adapter 138 to the strut 46.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A system for rebroadcasting a source signal originating from a location external to the system, comprising:
   a receiving antenna configured to acquire a broadcast radio transmission, wherein directionality of the receiving antenna in elevation and azimuth and receiving antenna gain are prescribed, and wherein receiving antenna polarization is elliptical with a first handedness;
   a transmitting antenna configured to radiate a broadcast radio transmission, wherein a radiation pattern of the transmitting antenna is substantially omnidirectional with respect to azimuth, and wherein transmitting antenna polarization is elliptical with a second handedness; and
   an interconnecting signal line coupling the receiving and transmitting antennas.

2. The system of claim 1, further comprising:
- an amplifier interposed between the receiving and transmitting antennas, wherein the amplifier has an input port and an output port; and
- a second interconnecting signal line, wherein the respective signal lines couple signals from the receiving antenna to the amplifier input port and from the amplifier output port to the transmitting antenna.

3. The system of claim 2, wherein at least one interconnecting signal line is a coaxial cable.

4. The system of claim 2, wherein the amplifier further comprises:
- a gain stage, wherein the gain stage provides a prescribed extent of amplification for broadcasting;
- an automatic gain control (AGC), wherein a broadband signal power level at the amplifier output port is so regulated by the AGC as to have a lesser variation than the source signal applied to the amplifier input port; and
- a filter, wherein signal energy applied to the amplifier input port that falls outside a prescribed frequency passband is attenuated at least in part.

5. The system of claim 4, wherein the filter compensates in-band signals at least in part for frequency-dependent signal phase and magnitude changes introduced within the system.

6. The system of claim 2, wherein at least one interconnecting signal line is a fiber optic cable.

7. The system of claim 1, further comprising a transmitting antenna radome, wherein the transmitting antenna radome encloses the transmitting antenna at least in part.

8. The system of claim 1, further comprising a receiving antenna radome, wherein the receiving antenna radome encloses the receiving antenna at least in part.

9. The system of claim 1, further comprising:
- a receiving antenna mount configured to permit positioning and retention of the receiving antenna in an orientation that supports reception of the source signal, wherein a range and precision of adjustment and a characteristic of mechanical stability of the receiving antenna mount are compatible with the directionality of the receiving antenna and of an anticipated level of system maintenance; and
- a transmitting antenna mount configured to permit positioning and retention of the transmitting antenna in an orientation that supports propagation of the signal emitted by the transmitting antenna.

10. The system of claim 1, further comprising a signal passthrough fitting, wherein the receiving antenna is located externally to an enclosing structure that impedes electromagnetic wave propagation over a range of frequencies, wherein the transmitting antenna is located internally to the enclosing structure, and wherein the signal passthrough fitting accommodates passage of a signal carried by the interconnecting signal line between the respective antennas.

11. The system of claim 1, wherein the receiving antenna and the transmitting antenna are both located internally to an enclosing structure that impedes propagation of electromagnetic signals over a range of frequencies.

12. The system of claim 1, further comprising:
- a second receiving antenna;
- a signal combiner configured to accept a plurality of electromagnetic signals over a frequency range, applied to a plurality of input ports thereof, and further configured to provide a single output signal substantially inclusive of the input signal content, on an output port thereof; and
- a plurality of interconnecting signal lines that establish connectivity between the respective receiving antennas and the respective signal combiner input ports, and between the combiner output port and the transmitting antenna.

13. The system of claim 1, further comprising:
- a second transmitting antenna;
- a signal splitter, configured to accept an electromagnetic signal over a frequency range, applied to an input port thereof, and further configured to provide a plurality of output signals, substantially inclusive of the input signal content, on a plurality of output ports thereof; and
- a plurality of interconnecting signal lines that establish connectivity between the receiving antenna and the signal splitter input port, and between the respective splitter output ports and the respective transmitting antennas.

14. The system of claim 1, wherein the transmitting antenna further comprises a bay wherein four dipoles have quasi-helical orientation and approximate fourfold rotational symmetry with reference to a common vertical axis.

15. The system of claim 1, wherein the transmitting antenna further comprises:
- a coupling body, wherein the coupling body further comprises an input port; and
- a manifold feed plate, wherein the manifold feed plate further comprises:
- a central node configured to connect via the coupling body to an interconnecting signal line;
- a plurality of feed blades whereby signals are distributed from the central node to a plurality of dipole feed points; and
- a plurality of tuning paddles connected to the respective feed blades, wherein the tuning paddle orientations and dimensions determine transmitting antenna impedance, at least in part, with reference to the coupling body input port.

16. A system for rebroadcasting a source signal originating from a location external to the system, comprising:
- means for receiving an electromagnetic signal from a broadcast radio transmission, wherein the means for receiving has elliptical polarization with a first handedness;
- means for retransmitting an electromagnetic signal from a broadcast radio transmission, wherein the means for retransmitting has elliptical polarization with a second handedness, opposite to the handedness of the means for receiving; and
- means for coupling a signal from the means for receiving to the means for retransmitting.

17. The system for rebroadcasting of claim 16, further comprising means for controlling signal characteristics, interposed between the means for receiving and the means for retransmitting, wherein the means for controlling signal characteristics comprises:
- means for accepting a received signal supplied from the means for receiving;
- means for supplying an output signal for application to the means for retransmitting;
- means for adjusting relative amplitudes of a plurality of component frequencies of the received signal;
- means for adjusting relative phase between a plurality of component frequencies of the received signal;
- means for increasing output signal power with reference to received signal power; and
- means for regulating output signal power, as supplied to the means for retransmitting, with reference to received signal power.

18. The system for rebroadcasting within a structure of claim 16, wherein the means for retransmitting further comprises:
- means for accepting a signal to be retransmitted;
- means for distributing energy of an accepted signal to a plurality of spatially discrete emitters with substantially equal magnitude and phase, wherein the emitters are positioned with rotational symmetry with reference to a reference axis of the means for accepting a signal;
- means for terminating a plurality of emitters, wherein the means for terminating cause the means for accepting a signal to exhibit a substantially nonreactive net impedance; and
- means for propagating distributed signal energy in the form of electromagnetic radiation from a like plurality of discrete locations, wherein the electromagnetic radiation exhibits elliptical polarization with a specified axial ratio.

19. The system for rebroadcasting within a structure of claim 16, wherein the means for retransmitting further comprises means for concealing the means for retransmitting from view at least in part, wherein the means for concealing introduces less than 3 dB of attenuation of the retransmitted broadcast radio signal.

20. A method for rebroadcasting a source signal originating from a location external to the system, comprising:
- receiving an electromagnetic signal from a broadcast radio transmission having a first handedness of elliptical polarization;
- transferring the signal to an amplifier, wherein the amplifier performs the steps of:
- accepting the signal;
- attenuating out-of-band signal energy;
- adjusting relative phase of in-band signal frequency components;
- increasing overall signal power;
- regulating overall signal power; and
- furnishing the amplified signal for retransmission;
- applying the received and amplified signal to a radio signal emitter having a second handedness of elliptical polarization; and
- coupling the signal from the emitter to a surrounding region.

21. The method for rebroadcasting within a structure of claim 20, wherein applying the received and amplified signal to the radio signal emitter further comprises:
- establishing n arcuate dipoles disposed with approximate n-fold rotational symmetry and quasi-helical orientation about a vertical axis;
- interconnecting midpoints of the respective dipoles at a reference potential common to the received and amplified signal;
- distributing the received and amplified signal to the arcuate dipoles at feed points distal to the midpoints of the respective dipoles; and
- providing impedance cancellation proximal to the feed points using tuning paddles.

22. The method for rebroadcasting within a structure of claim 21, wherein establishing n arcuate dipoles further comprises:
- cutting a conductive material to form m components having p dipoles each, wherein m is an integer number of components, p is an integer number of dipoles per component, and n is the number of dipoles; and
- conductively stacking the components with rotational symmetry of position.

* * * * *